US009049105B1

(12) United States Patent
Feinstein et al.

(10) Patent No.: US 9,049,105 B1
(45) Date of Patent: Jun. 2, 2015

(54) SYSTEMS AND METHODS FOR TRACKING AND MANAGING EVENT RECORDS ASSOCIATED WITH NETWORK INCIDENTS

(75) Inventors: Brian J. Feinstein, Mercer Island, WA (US); Geoffrey E. Endresen, Everett, WA (US); John W. Heitmann, Seattle, WA (US); Luan K. Nguyen, Auburn, WA (US); Viraj Sanghvi, Seattle, WA (US); Brian T. Smith, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/469,922

(22) Filed: May 11, 2012

(51) Int. Cl.
*G06F 15/173* (2006.01)
*H04L 12/24* (2006.01)

(52) U.S. Cl.
CPC ..................................... *H04L 41/06* (2013.01)

(58) Field of Classification Search
USPC ............................ 709/201–203, 206, 207, 22; 715/200–204, 700, 733–741
See application file for complete search history.

(56) References Cited

U.S. PATENT DOCUMENTS

| | | | | |
|---|---|---|---|---|
| 5,682,330 A * | 10/1997 | Seaman et al. | | 358/403 |
| 6,593,940 B1 * | 7/2003 | Petersen et al. | | 715/700 |
| 6,993,246 B1 * | 1/2006 | Pan et al. | | 386/201 |
| 7,237,137 B2 * | 6/2007 | Goeller et al. | | 714/1 |
| 7,509,388 B2 * | 3/2009 | Allen et al. | | 709/207 |
| 7,664,853 B2 * | 2/2010 | Hagale et al. | | 709/224 |
| 7,996,355 B2 * | 8/2011 | Childs et al. | | 707/602 |
| 8,275,816 B1 * | 9/2012 | Pegg | | 707/829 |
| 8,443,080 B2 * | 5/2013 | Ding et al. | | 709/224 |
| 8,606,644 B1 * | 12/2013 | Bruckhaus et al. | | 705/26.1 |
| 2003/0074440 A1 * | 4/2003 | Grabarnik et al. | | 709/224 |
| 2008/0209307 A1 * | 8/2008 | Barstow et al. | | 715/203 |
| 2008/0256430 A1 * | 10/2008 | Gold | | 715/200 |
| 2010/0057870 A1 * | 3/2010 | Ahn et al. | | 709/206 |
| 2011/0225233 A1 * | 9/2011 | Casalaina et al. | | 709/203 |
| 2011/0314148 A1 * | 12/2011 | Petersen et al. | | 709/224 |
| 2012/0005177 A1 * | 1/2012 | Bao et al. | | 707/705 |
| 2012/0278378 A1 * | 11/2012 | Lehane et al. | | 709/201 |
| 2013/0024524 A1 * | 1/2013 | Graff et al. | | 709/206 |
| 2013/0041934 A1 * | 2/2013 | Annamalaisami et al. | | 709/203 |
| 2013/0041958 A1 * | 2/2013 | Post et al. | | 709/206 |

* cited by examiner

*Primary Examiner* — Hassan Kizou
*Assistant Examiner* — Phyllis Book
(74) *Attorney, Agent, or Firm* — Sutherland Asbill & Brennan LLP

(57) ABSTRACT

One or more event records associated with incidents that may occur in a network may be created and stored in an event sequence with other related event records. Whether the event records are related may be determined based at least in part on a dependency between network elements associated with the incidents. The one or more event records may be executed by event handlers to create additional event records, which may also be stored in an event sequence with related event records. A user may request event sequences for display at a user device. Event sequences may be processed to provide at least a portion of the sequences based at least in part on user-specific information. A user may interact with and/or respond to event records in the network. Such interactions or responses may also be stored as event records in an event sequence.

24 Claims, 7 Drawing Sheets

US 9,049,105 B1

SYSTEMS AND METHODS FOR TRACKING AND MANAGING EVENT RECORDS ASSOCIATED WITH NETWORK INCIDENTS

BACKGROUND

Network elements such as hardware and software may experience various issues. Numerous actions may be required to address the issues, such as generating reports, notifying appropriate persons capable of resolving the issues, notifying customers and/or users impacted by the issues, dispatching technicians to a trouble area, ordering components to replace defective components, and other actions that may relate to addressing the issues. Information associated with these actions may be stored in various systems without being associated with one another. For at least this reason, it may be difficult to leverage existing knowledge regarding previous responses to related issues in a way that facilitates more consistent and efficient responses to issues involving network elements.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
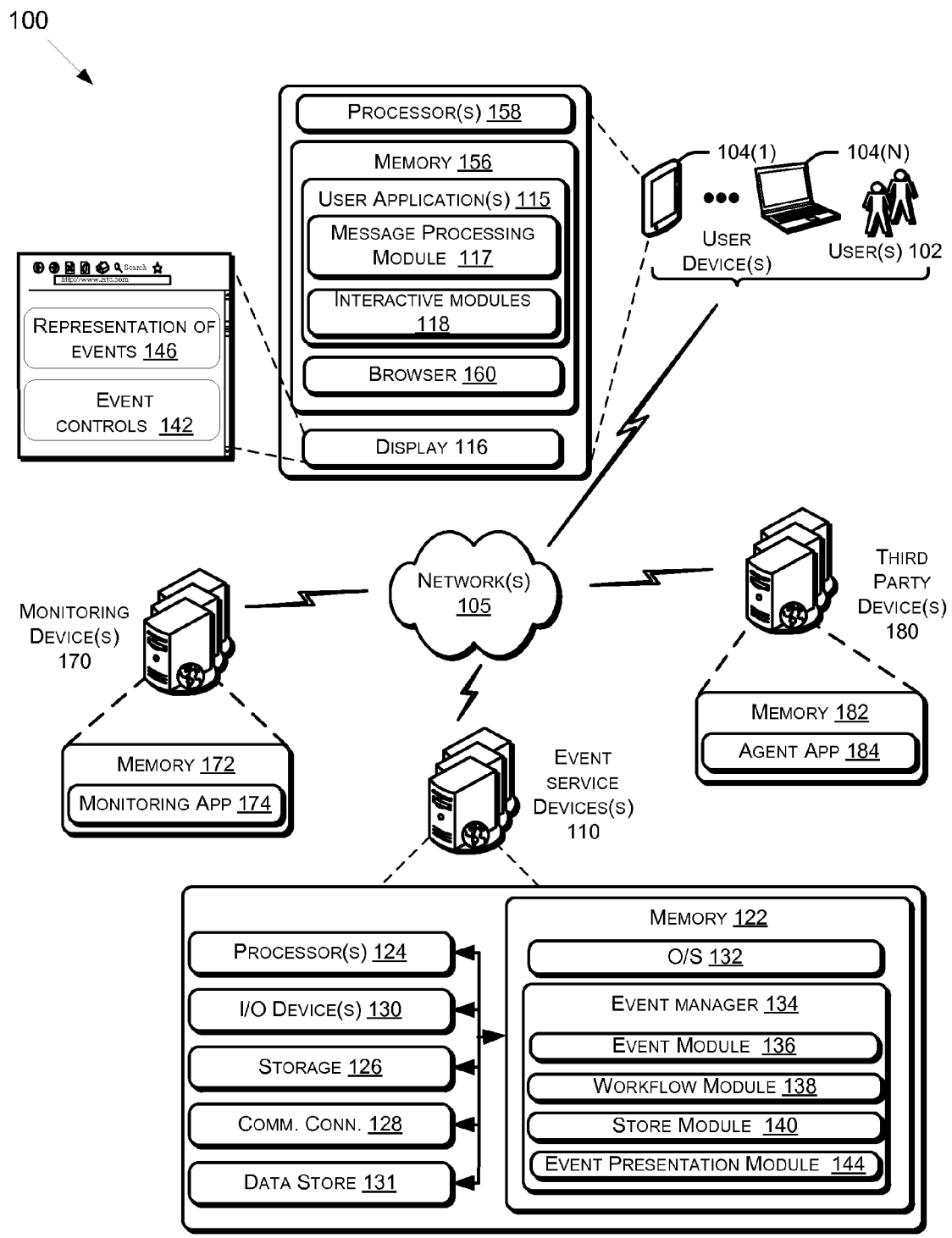
FIG. 1 illustrates an example computing environment for managing event records in an event sequence, according to one embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Illustrative embodiments herein are directed to, among other things, tracking and managing incidents that occur in a network, such as an outage or other abnormal condition. One or more event records may be created in association with an indication that an incident has occurred, an indication of a response to the incident, or various other messages associated with the incident. For example, in response to receiving an indication that an event has occurred, a request to generate a report related to the incident and a request to notify persons who may be responsible for responding to the incident may be created. These event records may be executed by a processor device to provide the corresponding generation of the report and notification of responsible persons. Such execution may in turn cause creation of one or more additional event records associated with the incident. Even more event records may be created in response to the most recently created event records (or any prior event records), and so forth, such that multiple event records may exist for each message or action associated with an incident. Such multiple event records may be stored in an event sequence associated with the incident.

As other incidents occur, new event records may be created for those incidents in similar fashion to that described for the incident above. The new event records may be compared to existing event records stored in event sequences to determine whether the new event records are related to the existing event records. In one embodiment, such a relationship may be determined based on whether a dependency exists between the new and existing event records. The dependency may be determined based on various considerations. For example, in one embodiment, a dependency may exist if the incidents with which the new and existing event records are associated occurred at network devices (also referred to herein as network elements) that have a relationship with one another, which may also be based on various considerations, such as a frequency of communication between the network elements, a fingerprint or tracking identifier for the incidents which occurred at the network elements, or a supply chain associated with the network elements, as non-limiting examples. If a dependency exists, the new event records may be stored in the event sequence that includes the related event records. If a dependency does not exist, a new event sequence may be created for storing the new event records. Keeping related event records together in the same event sequence enables more efficient management, tracking, and resolution of the incident, as well as provides a log or audit trail for post-mortem analysis of the incident.

Certain embodiments herein are also directed to presenting event records for display at a user device. The event records may be processed to filter and/or format them for display on a user device. For example, filtering the event records may include identifying event records in event sequences for delivery and/or presentation to the user via the user device based on various criteria such as a user account associated with the user device. Formatting the event records, for example, may include preparing them for display on various user devices, such as a handheld device, tablet or a desktop computer having a larger display.

The timing of when event records, or at least a portion thereof, may be delivered to a user device may be based on a variety of factors. In one embodiment, the event records may be delivered in response to a request from a user associated with the user device for the event records. A request may be initiated by the user logging into an event service device configured to send the event records, or by the user sending an actual request for the event records by interacting with a dedicated software application or browser operating on the user device, as non-limiting examples. In examples in which a user is not logged into an event service device configured to send the event records, the user may receive an electronic message informing the user of the incident and/or directing the user to log in the event service device to receive event record updates. In other embodiments, a user who is already logged into the event service device may receive event records via a push from the event service device when, for example, the event service device creates a new event in association with a new incident.

After receiving event records at a user device, the user may view and interact with the event records on the user device. For example, a user may interact with the event records by submitting comments associated with the event records, deleting event records, prioritizing event records by marking or flagging certain event records, saving event records locally, etc. While certain embodiments refer to sending and interacting with event records, or similar, only a portion of the event records, information associated with the event records, or a representation of the event records may be sent to the user device and interacted with by a user at the user device.

In addition to user responses, computing devices may also respond or take action with respect to incidents, which may also be represented as one or more event records. For example, after detecting that a hardware network element is experiencing trouble, a computing device may track the associated event sequence, and if so designed, may take action with regard to the incident. For example, if no event records in the event sequence associated with an incident a computing device is tracking reflects the hardware network element being rebooted or restarted within a predetermined period of time, then the computing device may automatically reboot or restart the hardware network element. Additionally and/or alternatively, the computing device may respond by sending a message to one or more persons associated with the computing device. Each of these responses, whether from computing devices or users, may be represented as one or more event records that can be stored in an event sequence with other related event records associated with the incident.

An illustrative example of the above descriptions may be as follows. An event service device may receive a monitoring message from a network monitoring device which states "Message Type: Outage; Description: Interactive Voice Response (IVR) system offline, IP address 216.28.39.157," identifying an outage incident in which an organization's ability to route incoming customer calls to the proper agents may be affected. Based at least in part on the message, event records may be created to: (1) create a report, (2) add a description to the report, (3) assign the report to an IVR group associated with the IVR system, and (4) generate an electronic mail message notifying the IVR group about the incident. After executing these four event records, a fifth event record may be created to (5) add the organization's president to the copy line of the electronic mail message. The fifth event record may be created by parsing the message notification of the incident and applying a rule that the organization's president should be notified of "outage" message types, and in this sense may be a new event record resulting from the execution of an event record. The five event records may be stored in a first event sequence due to their relationship with the IVR outage.

A software developer in the IVR group, who is not logged into the event service device, may receive an electronic message informing him about the IVR outage incident. The software developer may then log into the event service device using a user device, such as a lap top computer or tablet, to view the event record(s) associated with the outage incident and, by virtue of logging in, the event records associated with the incident may be sent from the event service device to the software developer's user device. The software developer may also send a request for the event record from the user device, which may also cause new and/or updated event records to be sent to the user device. According to an example in which the software developer is already logged into the event service device using a user device, the event record(s) may be pushed to the user device (e.g., without the user initiating a request) or the software developer may send a request for the event record(s) via the user device, which in either case may result in new and/or updated event records to be sent to the user device.

After receiving a notification of the outage event by, for example, reviewing the event record(s), the software developer may investigate the issue. After determining that the outage is related to a software bug, the software developer may take certain actions, such as (6) debugging the software and (7) installing a new version of the software at an IVR device associated with the IP address indicated in the message, either of which may result in a new event record when submitted to or otherwise recorded at the event service device. In an embodiment, the new event records may also be stored in the first event sequence due to their relationship with the IVR outage.

A second monitoring message indicating that a software module for purchasing products has experienced a failed execution may be received in a similar format to that in the above monitoring message. Also, one or more event records associated with this incident may be created in similar fashion to the above description. A dependency between the event records associated with the software module and the event records associated with the IVR outage may be determined. A dependency may be determined based on various considerations, which will be discussed in greater detail below. For the purposes of this example, it is likely that no dependency exists between the IVR outage event and the failed software module event because the IVR device that experienced the outage and the hardware device that processes instructions associated with the software module do not have any operational interdependency. If no dependency is found, then the event records associated with the software module incident may be stored in a second event sequence instead of in the first event sequence because the event records may be considered unrelated to one another. If a dependency is found, for example, based on the determination that the same person is responsible for the software update to the respective servers where each resides, then the event records associated with the failed software module may be stored in the first event sequence along with the IVR outage event records because the event records may be considered related to one another.

Event records associated with the IVR outage incident and the failed software module incident can be sent to various users based on, for example, incident-related parameters such as type, severity, dependencies on other network elements, etc., and/or other considerations such as the type of user and/or the user's interests, user's profile, timing, etc., as non-limiting examples. For example, an engineer may have an interest and/or job requirement to view event records relating to purchase fulfillment events, such as those in the present example where an IVR directs purchasers to agents and the software module manages product purchase transactions. The user device of the engineer may therefore receive the event records in the first event sequence and the event records in the second event sequence. A second engineer, however, may be only have an interest and/or job requirement to view only IVR-related event records. Thus, the user device of the second engineer may receive only the event records in the first event sequence, which includes event records related to the IVR outage.

FIG. 1 illustrates an example computing environment 100 for managing event records in an event sequence, according to one illustrative embodiment. The computing environment may include, but is not limited to, one or more event service devices 110, one or more monitoring devices 170, one or more third party devices 180, and various user devices 104 (1)-(N) (collectively user devices 104) for use by users 102. Each of these devices may communicate with one another via one or more networks 105 to facilitate the management of event sequences as described herein. For example, an event service device 110 may receive messages associated with an incident from a monitoring device 170, a user device 104, and/or a third party device 180, create one or more event records based on the messages, and transmit event records for presentation to the user device 104 or for processing by the third party device 180. Users 102, such as employees in an organization, may view and/or interact with the event records via the user devices 104.

As used herein, the term "device" can refer to any computing component that includes one or more processors that can be configured to execute computer-readable, computer-implemented, or computer-executable instructions. Example devices can include personal computers, server computers, digital assistants, smart phones, personal digital assistants, digital tablets, Internet appliances, application-specific circuits, microcontrollers, minicomputers, transceivers, customer premise equipment such as set-top boxes, kiosks, or other processor-based devices. The execution of suitable computer-implemented instructions by one or more processors associated with various devices may form special purpose computers or other particular machines that may facilitate management of event sequences as described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program may be configured to access, including signals downloaded through the Internet or other networks. For example, distribution of software may be downloaded via the Internet.

The one or more networks 105 may include any number of wired or wireless networks that can enable various computing devices in the example computing environment 100 to communicate with one another. In other embodiments, other networks, intranets, or combinations of different types of networks may be used, including, but not limited to, the Internet, intranets, cable networks, cellular networks, landline-based networks, or other communication mediums connecting multiple computing devices to one another. Other embodiments may not involve a network and may, for example, provide features on a single device or on devices that are directly connected to one another, e.g., the third party device 180 may be directly connected to the event service device 110.

The devices illustrated in FIG. 1 may include one or more processors configured to communicate with one or more memory devices and various other components or devices.

For example, the event service device 110 may include one or more processors 124 that are configured to communicate with one or more memory devices 122, one or more input/output (IO) devices 130, storage 126, one or more communication connections 128, and one or more data stores 131. The processor 124 may be implemented as appropriate in hardware, software, firmware, or combinations thereof. Software or firmware implementations of the processor 124 may include computer-executable or machine-executable instructions written in any suitable programming language to perform the various functions described herein.

The memory 122 may store program instructions that are loadable and executable on the processor 124, as well as data generated during the execution of these programs. Depending on the configuration and type of event service device 110, the memory 122 may be volatile, such as random access memory (RAM), and/or non-volatile, such as read-only memory (ROM), flash memory, etc. The memory 172 associated with the monitoring device 170 and the memory 182 associated with the third party device 180 may be the same or at least similar to the memory 122 in one embodiment.

The storage 126 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 122 may include multiple different types of memory, such as static random access memory (SRAM), dynamic random access memory (DRAM), or ROM.

The memory 122 and the storage 126, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The one or more communication connections 128 may allow the event service device 110 to communicate with other devices, e.g., user devices 104, databases, user terminals, and various other devices that may exist on the one or more networks 105. The input/output (10") devices 130 may enable a user to interact with the event service device 110. Such IO devices may include, but are not limited to, a keyboard, a mouse, a pen, a voice input device, a touch input device, a display, camera or imaging device, speakers, or a printer.

The one or more data stores 131 may store lists, arrays, databases, flat files, etc. In some implementations, the data store 131 may be stored in memory external to the event service device 110 but accessible via the one or more networks 105, such as with a cloud storage service. The data stores 131 may store information associated with event records and/or other information that may facilitate implementation of the processes described herein.

The monitoring device 170 and third party device 180 may include some or all of the devices or components described above in association with the event service device 110, several of which are discussed below.

The memory 122 may also include an operating system 132 and various software applications and/or modules that may implement the management of event sequences. Example modules may include an event module 136, a workflow module 138, a store module 140, and an event presentation module 144. Each of these modules may be implemented as individual modules within the event manager 134 that provide specific functionality associated with managing event sequences. Alternatively, one or more of the modules may perform all or at least some of the functionality associated with the other modules.

The event manager 134 may interact with user devices 104 executing a browser 160 or an event client application 115. The event client application 115 may include software modules such as a message processing module 117 and/or an interactive module 118 to communicate with the event service device 110. In association with a user device 104, the event manager 134 may authenticate a user and determine a user's access permissions to event records and/or event sequences. Each user may have a user account that defines what the user has permission to view, which may be based on any number of factors associated with the incident, such as severity, timing, duration, location, etc. For example, some users, such as upper level managers, may have permissions that allow them to read and/or modify information associated with event records. Others, such as technicians, however, may only have permission to read (not modify) information associated with the same event records. In other embodiments, the manager may only receive the first event record in an event sequence, which may serve as a notification of the incident, whereas the technician may receive all the event records in the event sequence. As another example, a manager, having responsibility for a business unit, may receive all event records associated with the business unit while a technician, with less responsibility, may only receive event records related to the software or hardware over which the technician has responsibility. Thus, in response to a request or log-in, the event manager 134 may retrieve event records from one or more event sequences based on the user account and send the event records to the user device 104 of the user. In one embodiment, rather than sending an event record, a portion or representation of the event record 146 may be sent to the user device 104 by the event manager 134, which may itself be dependent on the user account associated with the user device. At the user device, the message processing module 117 may receive and process the event record. Alternatively, the event record may be processed and presented by a browser application 160 operating on the user device in which case certain functionality of the message processing module 117 and interactive module 118 may be incorporated into the event manager 134. The message processing module 117, as well as the browser application 160, are discussed in greater detail below.

The event module 136 may receive messages associated with an incident and create one or more event records based at least in part on the messages. The event module 136 may also verify whether an event record exists before creating a new event record to prevent unnecessary creation of event records. In one embodiment, the workflow module 138 may create a workflow that includes the created event records and then manage the execution of those event records. In an embodiment, the execution of an event record may in turn result in the creation of one or more additional event records. The store module 140 may store the event records in an event sequence, wherein an event sequence may include related event records. For example, event records may be related because they are associated with the same incident or related incidents. To determine in which event sequence to store an event record, the store module 140 may determine whether a dependency exists between the event records using, for example, one or more criteria, algorithms, and/or techniques. In certain embodiments, the store module 140 may be driven by one or more user-configurable rules that may control the behavior of the store module 140, as will be discussed in greater detail below. The event presentation module 144 may also process event sequences to provide users with one or more event records from event sequences with which the users have permission. The event presentation module 144 may process the event sequences to, for example, format the event records for display on a particular user device. The event presentation module 144 may also filter the event records based on various criteria. For example, the event records may be filtered according to a user account, as discussed above, such that event records presented to the user are only those which the user has permission to view. Filtering event records will be discussed in greater detail below. In addition, functionality associated with each of the modules of the event manager 134 will be described in greater detail in association with the figures below.

The event manager 134 may also perform various other functions. For example, the event manager 134 may identify hotspots or trouble areas in a network. In one embodiment, the event manager 134 may process one or more event sequences to identify multiple incidents that are associated with one or more related network element(s), such as a server farm having power disruptions across multiple servers. Event records in these event sequences, based on certain criteria and/or thresholds, may indicate that the network element or elements are experiencing trouble. For example, the network element may be experiencing trouble if it experiences numerous events, e.g., more so than what is typical, within a brief period of time, or if multiple incidents are occurring at the same location. The event manager 134 may create a single event record representing the numerous event records or event sequences associated with the network element or elements.

Various devices, such as the monitoring device 170 and the third party device 180, may send messages to the event service device 110 via the network 105. For example, the monitoring device 170 may include a memory 172 that may include a monitoring application 174 that may monitor network devices coupled to the network 105, including the event service device 110, third party device 180, and other devices (not shown), to identify and report problems (e.g., incidents) with the devices. As another example, the third party device 180 may include a memory 182 that may include an agent application 184 that may identify event records or event sequences for which action may be taken to resolve an incident, and/or provide, initiate, report or facilitate such action or resolution. For example, the agent application 184 may send a command to automatically reboot a device that is the subject of a network incident if the event sequence associated with that incident fails to include an event record within a predetermined period of time that reflects the impacted device being rebooted. Additionally and/or alternatively, the agent application 184 may send an update regarding the incident to the event module 136, which may store the update as a new event record in an event sequence associated with the incident, according to an embodiment.

The user device 104 may include a processor 158, which can be configured to process computer-executable instructions in one or more memory devices 156, and a display 116. In certain embodiments, the one or more memory devices 156 may include an event client application 115, which may be a dedicated application or part of a dedicated application that renders and manages (i.e., drives) the presentation of information associated with event records on the display 116, which may be a graphical user interface (GUI), on a user device such as a smart phone or tablet. The event client application 115 may include a message processing module 117 and interactive module 118. In one embodiment, the message processing module 117 may process information associated with event records, which may include formatting the information for the display 116, e.g., based on the type of user device 104, and/or filtering the event records prior to displaying it, or a representation 146 of it, on the user device 104. The interactive modules 118 may enable a user 102 to respond to event records via, as non-limiting examples, posting or submitting comments to an event record, deleting an event record, changing a status of an event record, prioritizing the event records by marking or flagging certain event records, or saving the event records locally. Processing event records and responding to event records will be discussed in greater detail below. In this manner, the event client 115 manages communications with the event manager 134 via network 105.

The one or more memory devices may also include a browser application 160. In one embodiment, the browser application 160 may be utilized to assess and communicate with the event manager 134, or a web server associated therewith, via network 105. In one embodiment, the functionality provided by the message processing module 117 and the interactive modules 118 may be provided by the event service device 110, such as, for example, by the event manager 134. According to this embodiment, the web browser 160 may display a web page via a markup language application such as Hypertext Markup Language (HTML) or extensible markup language (XML), which may include embedded server-side code on the event service device 110, such as Java, Java servlets, or Perl, that may implement the described functionality.

The display 116 may include a representation of event records 146 and event record controls 142 for viewing and interaction with event records, respectively. The presentation of event records 140 may include information associated with the event records, including, but not limited to, a notification that an event occurred, a description of the event, a time at which the event occurred, a number of related events, previous responses or resolutions associated with the events, users who were involved in the responses or resolutions, and the total time required to clear an outage. The event records may be presented individually or in relation to other event records, such as by grouping or otherwise associating event records in the same sequence. Event records may be presented in various ways, in the presentation of event records 140, to facilitate a user's viewing and interaction with the event records, as will be discussed in greater detail below.

The event record controls 142 may facilitate viewing, modifying, commenting, and otherwise interacting with event records presented on display 116 via user inputs into the browser interface of the browser application 160 or the user interface of the interactive module 118 of event client application 115. For example, the event record controls 142 may enable a user to interact with event records by adding comments associated with the event records, deleting event records, prioritizing event records by marking or flagging certain event records, adding a picture or image to an event sequence, adding an audio recording to an event sequence, or saving event records locally, as non-limiting examples. The event record controls 142 may also facilitate communication of the information by the user to the event manager 134 for processing and/or storing in an event sequence. For example, while user input to delete an event record presented by representation of event records 146 on the user device 104 may result in removing the event record from the display 116, the message processing module 117 may also send an indication to the event manager 134 to delete the event record in connection with the user account associated with the user so that user will no longer receive the deleted event record in subsequent updates.

As noted, the message processing module 117 may process information associated with event records by formatting and/or filtering information associated with event records prior to displaying it on the user device 104. Formatting may be used to affect the way the information associated with the event records is structured, organized, arranged, or otherwise presented. The message processing module 117 and the browser 160 may provide different formatting options for information associated with event records that are presented to the user on the user device 104. For example, the web browser 160 may provide a web-based look and feel (e.g., with hyperlinks and other standard web components) such as that provided by Internet Explorer® or Firefox®, as examples. The message processing module 117 may be a client-side application running on the user device 104 that functions with a server-side application, e.g., the event manager 134 at the event service device 110. The message processing module 117 may permit a faster, more fluent presentation of information associated with event records than the web browser 160, in one embodiment. Various programming languages may be used to develop the message processing module 117, as well as the event manager 134 and its associated modules. Such programming languages can include, but are not limited to, JavaScript, Java, Perl, C, C++, C#, Visual Basic, and Python. Markup languages such as Hypertext Markup Language (HTML) and extensible Markup Language (XML) may also be used.

In one example, formatting may include representing the information associated with event records as one or more representative icons associated with the event records. In one embodiment, the icons may be presented in a manner analogous to an organizational chart or a network topology. When a user clicks on or selects a representative icon, information associated with the event record may be displayed. Information associated with the event records may also be grouped into categories, e.g., severe, less severe, or normal event records (which will be discussed in greater detail below) that can be expanded and collapsed. Further, according to an example, the display 116 may include a folder representing a group for each of the categories. After a user selects the folder, each representative icon that corresponds to information associated with event records may be displayed on the display 116. After a user selects the icon, the display 116 may show the information associated with the event record. Alternatively, when presenting event records via the browser application 160, a reference such as a hyperlink that may represent such information associated with an event record may be presented at the user device 104. After a user selects the reference, a request may be sent to the event service device 110 to display the information associated with the reference.

Formatting the information associated with event records may also include applying color codes or other distinguishing indicia in the presentation of event records. In some embodiments, severity levels may be established for event records and/or sequences. The severity levels may be defined based on the message received by event service device 110, e.g., a monitoring message associated with a device outage may be considered a severe event, as compared to a comment message providing a status update to an incident sent from a user device 104 which may be considered a less severe event.

In one example, severe event records may receive a red color association, less severe event records may receive a yellow color association, and normal event records may receive a blue color association. In another example, the user device 104 may display only severe event records, or in yet another embodiment, it may display the severe event records above or in front of the less severe event records. Numerous examples may exist in other embodiments in accordance with various types and degrees of severity, types of incidents, types of messages, and the corresponding user interface feature based on color codes, event record arrangements, event record representations, event record illustrations, etc.

Formatting may also include applying visual and/or audible alarms associated with the event records. For example, a user that is logged into the event service device 110 may hear an alert sound when an event record associated with a severe event is received at the user device associated with the user. A more pleasant sound may be played for normal event records, however. In one embodiment, a notification sound may also or alternatively be heard when a user clicks on the symbol associated with an event record to get more information about the event record.

Filtering may include identifying a portion of the event record for display. For example, the message processing module 117 may receive information associated with one or more event records belonging to an event sequence, which may include information associated with event records over a period of time. Instead of displaying information associated with all of the event records, the message processing module 117 may filter the information associated with event records to include only the information associated with event records that were created on/after/before a specified day, or within a specified time frame, such as the last 24 hours. The filtering may also limit the presentation of event records to a particular number, such as the five to ten most recent event records in a sequence. In addition, a combination of time and count may be utilized to filter the event records presented to the user on the user device 104. Also, as noted, information associated with event records may be filtered based on, for example, a user account, type of user device (e.g., size and/or resolution of display 116), or access methodology (e.g., browser application 160 or event client application 115). Additional filtering examples will be provided in greater detail below.

The above examples are not meant to be limiting. Many more examples related to formatting, filtering, and responding to event records at the user device 104 may exist in other embodiments. While various functions are described above with respect to particular devices, it is understood that these functions may be distributed in many ways across the devices. For example, functionality provided by the event service device 110 may be provided at least in part by the user devices 104, monitoring device 170, and/or the third party device 180.

Figure 2:
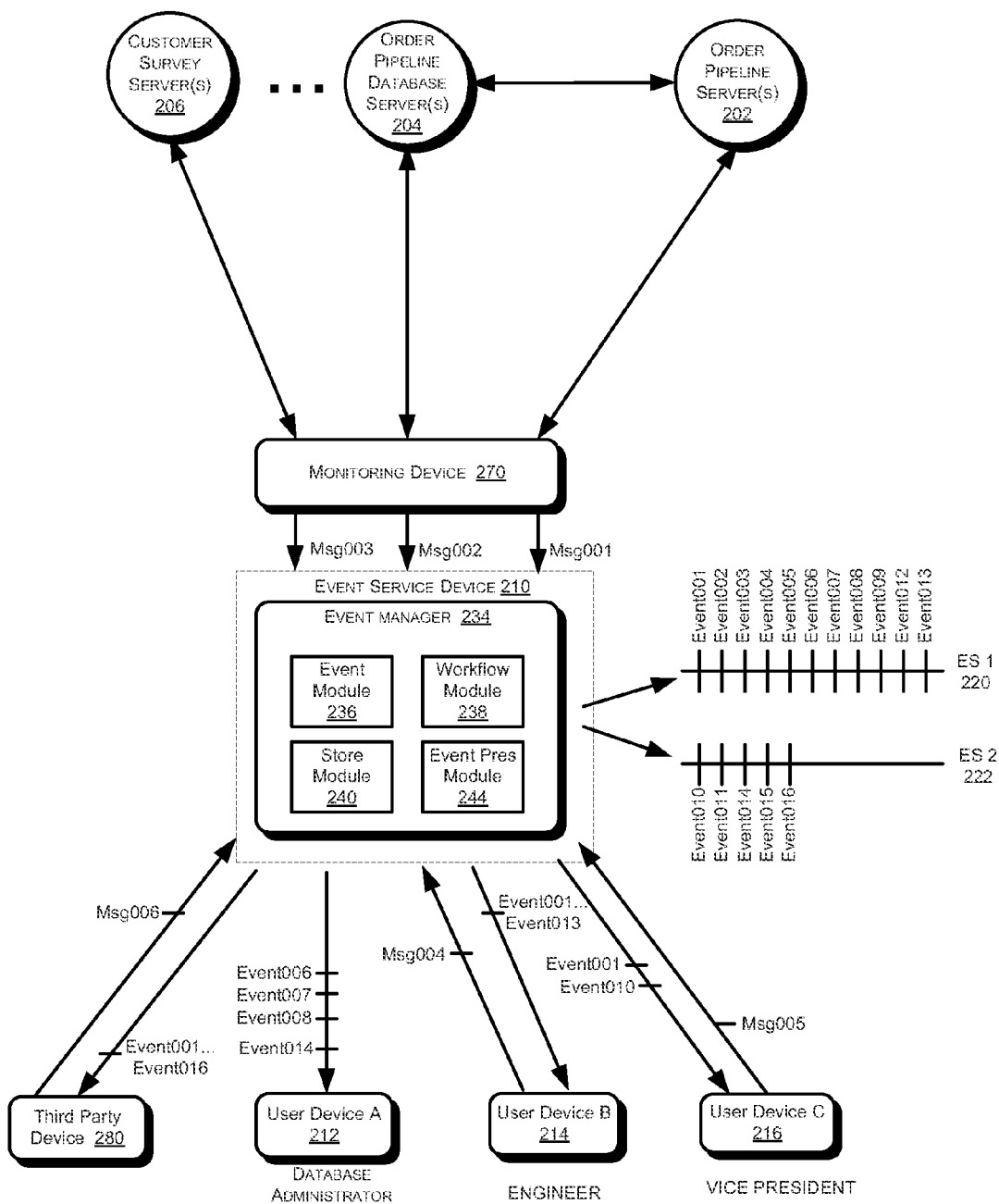
FIG. 2 illustrates a schematic diagram of an event service device managing event records among various devices and event sequences, according to one embodiment of the disclosure.

FIG. 2 illustrates a schematic diagram of an event service device 210 that tracks and manages event records associated with network incidents, according to one embodiment. For example, an order pipeline server 202 may communicate with an order pipeline database server 204 via a network, which is not shown in FIG. 2 to simplify the illustration, to implement functions related to order fulfillment. Other devices may also be connected, directly or indirectly, to the network, such as a customer survey server 206, which may manage customer feedback processes. A monitoring device 270 may monitor the order pipeline server 202, the order pipeline database server 204, and the customer survey server 206 for incidents, such as outages, errors, interruptions in service, etc. Certain embodiments herein are directed to receiving messages, creating and storing event records associated with the messages, and transmitting information associated with the event records to users, as discussed below with reference to FIG. 2.

Messages including information about an incident may be received by the monitoring device 270. In one example, the message may include text, code, pseudo code, images, audio, video, multimedia, or a combination of any number of these. Other types of messages may exist in other embodiments. In addition, various types of incidents may exist, such as, but not limited to, network incidents such as an outage, failed execution of computer code, hardware components failures, abnormal conditions, automated or manual service requests requested by a device or a user, maintenance issues, or service of life.

In an illustrative embodiment, the example messages above may be received, e.g., by the event service device 210, from various devices in the network, and may be processed by an event module 236 associated with event service device 210. One such device may be the monitoring device 270, which may monitor devices on the network to identify and report problems (e.g., incidents) with the devices. Messages may also be received from a third party device 280, which may send messages associated with tracking, monitoring, responding to incidents, and/or a user device (e.g., user devices 212, 214, and 216) associated with users that may be reporting an incident or interacting with an event record, as examples.

As shown in FIG. 2, as an illustrative example, the event manager 234 may receive a message (Msg001) from a monitoring device 270 that an outage incident has occurred in the order pipeline server 202, as the result of a failed hard disk. One or more event records associated with a message may be created, e.g., via an event module 236, to drive functions that may be required to resolve the outage. For example, after receiving the message Msg001, the event module 236 may create event records identifying the order pipeline server outage incident (Event001), notifying users about the order pipeline server outage (Event002), and generating an order for a new hard disk that failed in the order pipeline server (Event003). A workflow module 238 may include the one or more created event records, such as event records Event001-003, also in a workflow of event records associated with the outage incident. The workflow module 238 also may manage event handlers that execute or perform the event records Event001-003, and in so doing, may create one or more additional event records. For example, after executing event Event002 (i.e., notifying users about the outage), an event record may be created to the effect that the users were notified (Event004). As another example, the workflow module 238 may execute event record Event003 (i.e., generate a new order for a hard disk), which may result in a new event record indicating that the hard disk was ordered (Event005) and a new event record to notify users that the hard disk was ordered (Event006), and so forth, such that multiple event records may be created in association with the outage.

The monitoring device 270 may also detect that from the order pipeline database server 204 that the order pipeline is backlogged, and generate a message (Msg002) to the event manager 234 to that effect. As described above, one or more event records associated with that incident may be created by the event module 236. For example, event records may be created to notify users about the backlog (Event006) and reboot the order pipeline server 202 (Event007). The workflow module 238 may execute event record Event006, which in turn may create a new event record Event008 to the effect that users were notified. The workflow module 238 may also execute event record Event007 to reboot the server, which in turn may create event record Event009 to the effect that the order pipeline server 202 was rebooted.

At some time before, during, or after creating event records associated with the order pipeline incidents, the event module 236 may also receive a message (Msg003) from the monitoring device 270 that an outage incident in a customer survey server has occurred. Similar to that described in association with the order pipeline servers, one or more event records may be created in association with message Msg003. For example, the event module 236 may create an event record indicating the outage incident at the customer survey server 206 (Event010) and notifying users about the outage incident (Event011). Such event records may be included in a workflow and executed by event handlers managed of the workflow module 238 to create one or more additional event records, as described above.

In addition to the monitoring device 270, users at user devices 212, 214, and 216, for example, may also send messages to the event module 236, for which one or more event records may also be created by the event manager 234 and executed by the workflow module 238, in one embodiment. For example, an engineer at the user device 214 may send a message to the event manager 234 that the hard disk for the order pipeline server 202 has been received (Msg004). The event module 236 may receive the message and create event records indicating that the hard disk has been received (Event012) and notify all users logged into the order pipeline server 202 that the server will be shut down for maintenance (Event013).

The event records created by the event module 236 in the above examples may be stored in event sequences. Event sequences may be stored in a memory, such as the memory 122, storage 126, or an external memory associated with the event service device 110, as examples. Certain embodiments herein are directed to storing related event records in the same event sequence. The determination of which event records are or are not related may be based upon an association or relatedness between the underlying incidents, such as the operational dependency of the network elements experiencing the incident.

In one embodiment, an association or relatedness between event records may be determined based on whether the event records have a dependency between them. In one embodiment, such a dependency may be determined by the store module 240. A dependency may indicate an operational relationship, reliance, or association between network elements associated with the incidents associated with the event records. When a dependency exists between two network elements (e.g., hardware and software), as an example, an abnormal condition experienced in one network element may have an adverse effect on the other, dependent, network element. For example, software instructions residing in the memory of the order pipeline server 202 may have a dependency on an order pipeline database server 204 associated with the order pipeline database server 204 based on storage and execution needs of the software instructions. That is, the order pipeline server 202 may depend on the order pipeline database server 204 to provide database commands to a database that stores output that may result from executing the software instructions, and hence a dependency may exist between the order pipeline server 202 and the order pipeline database server 204. The order pipeline server 202 may also execute a software service, e.g., File Transfer Protocol (FTP), to transfer the output to a disk array device (not shown). Thus, the disk array device can be said to depend on the FTP software service, and vice-versa. A user, such as an engineer at user device 214, may depend (e.g., have an association or relatedness) on the order pipeline server 202, order pipeline database server 204, and the disk array device based, for example, on the job requirements of the engineer. The engineer's vice-president at the user device 216 may depend (e.g., have an association or relatedness) on the engineer's performance. If at least one of the order pipeline server 202, order pipeline database server 204, the software, or FTP software service becomes inoperable, the vice-president may not have the necessary information to make a decision because inoperability in one network element may prevent the other network element from performing its function. Thus, network elements in the above example may have a dependency on each other.

In some embodiments, an operational relationship between network elements that are related to an incident may be based on various factors. Such factors may include, but are not limited to, a frequency of communication between the network elements, a fingerprint or tracking identifier for the incidents which occurred at the network elements, a supply chain associated with the network elements, a distribution chain associated with the network elements, a fulfillment chain associated with the network elements, maintenance activity associated with the network elements, network topology (e.g., based on locations of network elements that experienced an incident such as a data center, rack mount, or virtual machine host location, etc.), the owner of the network elements (e.g., a software developer who created software or a system administrator of a hardware device), or various interrelated functions performed by network elements.

As an example, based on factors such as one or more of those listed above, a dependency may exist even when the inoperability in one network element may not adversely affect another network element. For instance, some network elements may have redundant network elements that may mirror their functionality. In this instance, a failed network element, such as a disk array device in the above example, may be replaced by another disk array device so that system operation is not materially impacted. Thus, when the disk array fails, both disk array devices may have a dependency with each of the other in the present example though the failure of one does not adversely affect the other. According to this example, a dependency may exist between network elements based on the network topology.

The example dependencies described above may be determined by analyzing or mining various information, including, but not limited to, system configuration files, system activity logs, error logs, network trace outputs, and other information that may indicate communication between network elements. Various other types of dependencies, operational relationships, or associations may exist in other embodiments.

In one embodiment, a dependency graph that may indicate associations or dependencies between network elements may be generated, e.g., by the event manger 134. The graph may include nodes representing network elements (hardware and/or software) and people, and edges connecting respective pairs of network elements and people. An edge may indicate a dependency between a pair of network elements. In the embodiment, the edges may be scored or weighted based on user configurations, or various activities that occur in a network. In a simplified example, each time a node A receives a communication from node B or from node C, it may increment a counter associated with each of the nodes B and C. The counters associated with node B and node C may be compared to each other or to a threshold value to determine whether a dependency exists. In one embodiment, the counters may be used to determine a weighting for the edge connecting node A to node B and the edge connecting node A to node C. According to this embodiment, the counter or some variation of the counter may indicate the weight for each edge. In one embodiment, if the counter values are greater than a threshold value, a dependency may exist or be considered sufficient. If the counter is less than the threshold value, a dependency may not exist or be considered insufficient. In another embodiment involving more nodes, and nodes that are multiple hops from one another, the edges between the nodes with respect to a central node, including the aggregation of edge values across multiple hops to the central node, e.g., node A in this example, may be ranked. The top ranked nodes based on a specified percentage, e.g., 50%, may be determined to have a dependency with node A (i.e., the dependency is considered sufficient), while the other nodes may not have a dependency with node A (i.e., the dependency is considered insufficient).

Regarding FIG. 2, a determination may be made that a dependency exists between the order pipeline server 202 and the incident associated with the order pipeline database server 204. At least for the purpose of illustration, it may be assumed that a dependency exists between the order pipeline server 202 and the order pipeline database server 204. However, it may be determined that a dependency does not exist between the incidents associated with the order pipeline servers (202 and 204) and the incident associated with the customer survey server 206.

Because event records Event001-009 are associated with the order pipeline server 202, i.e., an outage at the order pipeline server 202 and the responses associated with the outage, they may be considered related to one another. In one embodiment, therefore, Events001-009 may be stored in event sequence 220, e.g., by the store module 240. Similarly, because event records Event012 and Event013 are associated with a message from a user device regarding the outage at the order pipeline server 202 (Msg004 indicating that the hard disk has been received), event records Event012 and Event013 may also be considered related to event records Events001-009. Therefore, these event records may also be stored in event sequence 220 with other event records related to the order pipeline server outage. Event records Event010 and Event011 may not, however, be stored in event sequence 220 because, as noted, it is assumed that there is no association between event records associated with the order pipeline server 202 and event records associated with the customer survey server 206. Therefore, event records Event010 and Event011 may be stored in a separate event sequence, i.e., event sequence 222, as shown in FIG. 2.

In one embodiment, event sequences 220 and 222 may be time-based, and therefore, event records stored may be in a chronological order. For example, the event records may be ordered chronologically according to a time at which they occurred (e.g., were executed) or a time at which they were created. In the illustrative example, event Event001 may be determined to be the first event record related to the order pipeline server 202 outage and subsequently may be stored as the first event record in event sequence 220, both actions of which may be performed by a store module 240.

In one embodiment, the event sequence 220 may not exist before Msg001 is received. After a determination by the store module 240 that Event001 is the first event record associated with the outage at the order pipeline server 202 (according to one embodiment), the event sequence 220 may be created, e.g., by the event module 236. Subsequent event records Event002-009, Event012, and Event013 may be stored in chronological order in the event sequence 220, at least for the aforementioned reasons.

After determining that no dependency exists between event records related to the outage at the order pipeline server 202 and event records related to the outage of customer survey server 206, event sequence 222 may be created and the first event record associated with the outage, event record Event010, may be stored in event sequence 222. Subsequent event records related to the outage at the customer survey server 206, e.g., event record Event011, may be added to the event sequence 222 in chronological order. Further, new event sequences may be created for storing new event records associated with incidents that are unrelated to both the order pipeline server outage and the customer survey server outage, and so forth, such that multiple event sequences may exist, e.g., one for each incident according to one embodiment.

In certain embodiments, the manner in which event records are stored may be configured by a user through one or more rules that may drive the behavior of event record storage, e.g., via the store module 240. The rules may determine in which event sequences event records are stored, the order of such storage, or information that may be stored in association with event records, as non-limiting examples. In one embodiment, the rules may be based at least in part on various information, such as updated dependency data that may reflect changes in dependencies between network elements, or updated access permissions data that may determine which users may view event records, as non-limiting examples. Changes in such information may change how event records are stored. The rules may affect the storage of event records in real-time (e.g., as the event records are created and stored initially) or after event records are initially stored according to a user's manual direction to, for example, resort event records in event sequences based on new or updated rules and/or dependencies.

In one example, rules may cause the store module 140 to store event records in one event based on their relatedness to other events associated with an incident, as described in the example in FIG. 2. In another example, rules may cause event records to be stored in multiple event sequences. Storing event records in multiple event sequences may be driven by several factors, each of which may be reflected in rules for storing events. For example, prior knowledge that an event record may be related to more than one incident may be indicated in storage rules and subsequently cause an event to be stored in multiple event sequences. Also, storage rules may cause events to be stored in each sequence that is associated with a category of events. Applying this rule to the example in FIG. 2 may cause events related to the order pipeline server 202 outage and the customer survey server 206 outage to be stored in the same event sequence because both event sequences may be part of a category of outage incidents. Numerous other reasons for storing event records in multiple event sequences may exist.

After events are stored in one or multiple event sequences, events and event sequences may be manipulated based on new rules or the updated information mentioned above. As new dependency information is established for example, a user may cause the store module 140 to analyze existing events stored in event sequences and restore such events according to the new rules or information. According to various embodiments, event sequences may be combined or split according to the new rules. That is, event sequences may be split based on a rule that specifies a maximum number of events that may be stored in an event sequence. After inspection by the store module 140 in one embodiment, an event sequence that has a number of events that exceeds the maximum number of event records may be split into two or more event sequences such that the resulting event sequences no longer exceed the allowable limit of event records. As another example, new dependency information may cause certain events to be split from or extracted from event sequences because they may be more related to a different incident than determined by previous rules, in one embodiment. The extracted events may thereafter be stored in an event sequence with related events based on the new dependency information.

In addition to splitting events from event sequences, one or more modules such as the store module 140 may also combine event sequences after analyzing event records across event sequences based on updated rules and/or data. Combining event sequences may include storing event records that may be in two or more separate event sequences in a single event sequence. In one example, clusters of related event records or numerous event records that occur within a brief period of time, e.g., hotspots as described above, may be identified across multiple event sequences and combined into one or more event sequences associated with the hotspot. In another example, after determining that two event sequences include related event records, the event sequences may be combined. For example, power equipment may experience an outage and one or more event records may be stored in an event sequence associated with the power equipment outage. Subsequent to the power equipment outage, one or more servers may experience an outage, and one or more event records related to the server outages may be stored in a separate event sequence. According to this example, it may not be known that the server outages may be related to the power equipment outage. After executing the store module 140 to analyze existing event sequences, e.g., based on new rules and/or data, the store module 140 may identify an association between the power equipment outage event records and the server outage event records and subsequently combine the event records into an event sequence.

In each of the examples above, event records may be resorted and stored in a way consistent with user-configurable rules. For example, each time event sequences are split or combined, or otherwise based on a user or device's direction, events in an event sequence may be reordered e.g., in reverse chronological order, ordered according to network elements associated with the event record, or ordered according to a tracking or unique identifier associated with the event record, as non-limiting examples. Event records may also be re-executed to create one or more additional event records, which may also be stored according to rules that may drive the functionality of one or more modules such as the store module 140.

Returning to the example in FIG. 2, the event records stored in event sequences 220 and 222 may be sent to user devices as event records and/or event information associated with the event records or incidents that have occurred or are occurring. For example, the event records may be filtered based on a user account associated with the user such that different event records may be sent to different users. A user account may determine a user's access permissions to event records in the various event sequences. For example, as shown in FIG. 2, the vice-president at user device 216 may have access rights to view all of the event records associated with all network elements. An engineer at user device 214 may have access rights to view all of the event records associated with certain network elements, and a database administrator at user device 212 may have access rights to view only certain event records associated with certain network elements, such as only those associated with database servers. In one embodiment, event records may be filtered at the event service device 210 by the event record presentation module 244, while in other embodiments event records may be filtered at a user device, such as by the message processing module 117.

Additional filtering may be based on user preferences as may be stored in a user profile. For example, the vice-president may select to only view event records associated with outages, the engineer may select to view all event records to which the engineer has access. Similar filtering may be based on the time of day, type of event or associated incident, nature of event (e.g., status, update, notice, etc.), or age of event or associated incident. Such filtering may be implemented at the user device or at the event record presentation module 244.

In one embodiment, a user may request event records using a user device. The request may be initiated by the user logging into an event service device 210, or by the user manually initiating a request for event records by interacting with the event client application 115 or browser application 160 on the user device, as non-limiting examples. In examples in which a user is not logged into an event service device 210 configured to send the event records, the user may receive an electronic message informing the user of the incident and/or directing the user to log into the event service device 210 to receive event updates. In other embodiments, a user who is already logged into the event service device 210 may receive event records via a push from the event service device 210 when, for example, on a periodic basis or when a new event record is added to an event sequence to which the user has access.

The event record presentation module 244 may then send the processed and filtered event records to the users. In the illustrative embodiment, event records from the event sequences 220 and 222 may be sent to the database administrator at user device 212, the engineer at user device 214, and the vice-president at user device 216. For example, the database administrator at the user device 212 may receive event records Event006 and Event008 associated with notifying users about the order pipeline backlog because these event records are associated with database servers, that is, the order pipeline database server 204. The vice-president at user device 216 may only receive event records Event001, and Event010 because the vice-president may select to view only outage event records, and the engineer at user device 214 may receive all event records Event001-013 based on the engineer's access rights to all event records related to order fulfillment.

After receiving event records at a user device, a user may view and interact with the event records on the user device. For example, a user may interact with an event record by submitting comments associated with an event record, deleting an event record, prioritizing an event record by marking or flagging event records, saving the event records locally, etc. Such interaction may be facilitated by the event client application 115 or browser application 160 running on the user device. According to the example in FIG. 2, the vice-president at user device 216 may submit a comment regarding the outage at the customer survey server 206 (Msg005), which may be received by the event module 236. The event module 236 may create one or more event records associated with the comment (e.g., Event014 associated with receiving the comment), and then include the event Event014 in a workflow. A dependency between event Event014 and existing or prior event records may be determined and, based on the dependency, the event record Event014 may be stored in an event sequence with related event records, as described above. According to the present example, event record Event014 may be stored in event sequence 222 with other event records that are related to the customer survey server 220 outage. The event record Event014 may be sent to other users that have access rights to event sequence 222. In the present example, event record Event014 may be received by the database administrator at user device 212 by virtue of the database administrator receiving all event records associated with the customer survey server 206 (based on the example configuration above). The engineer at user device 214 may not receive event record Event014 because it is associated with a network element to which the engineer does not have event record access rights.

In addition to a user, a computing device connected to the network may also receive event records and interact with same. For example, the computing device may monitor event records in event sequences associated with certain incidents and/or network elements. Based at least in part on the results of such monitoring, the computing device may take certain actions and/or send a message to the event manager 234.

For example, a third party device 280, e.g., via the agent application 184 shown in FIG. 1, may receive event records in event sequences 220 and 222, and identify certain actions that may be taken to clear the incident, such as rebooting the server that experienced the incident. In one embodiment, the third party device 280 may send a message Msg006 to the event manager 234 that a reboot of the customer survey server 206 may restore the customer survey server 206. The event module 236 may receive Msg006 and create one or more event records associated with the message. For example, an event record may be created in association with a reboot request (Event015). An event handler associated with a workflow module 238 may execute the event record Event015 to perform the reboot. Such execution may also create one or more additional event records, one of which for example may be to notify users that the reboot was performed (Event016). Alternatively, in one embodiment, the third party device 280 may perform the reboot of the customer survey server 206 directly.

The above example is only one non-limiting example. Many more examples that may involve fewer or more devices, different types of devices, and/or different types of event records, for example, may exist in other embodiments.

Figure 3:
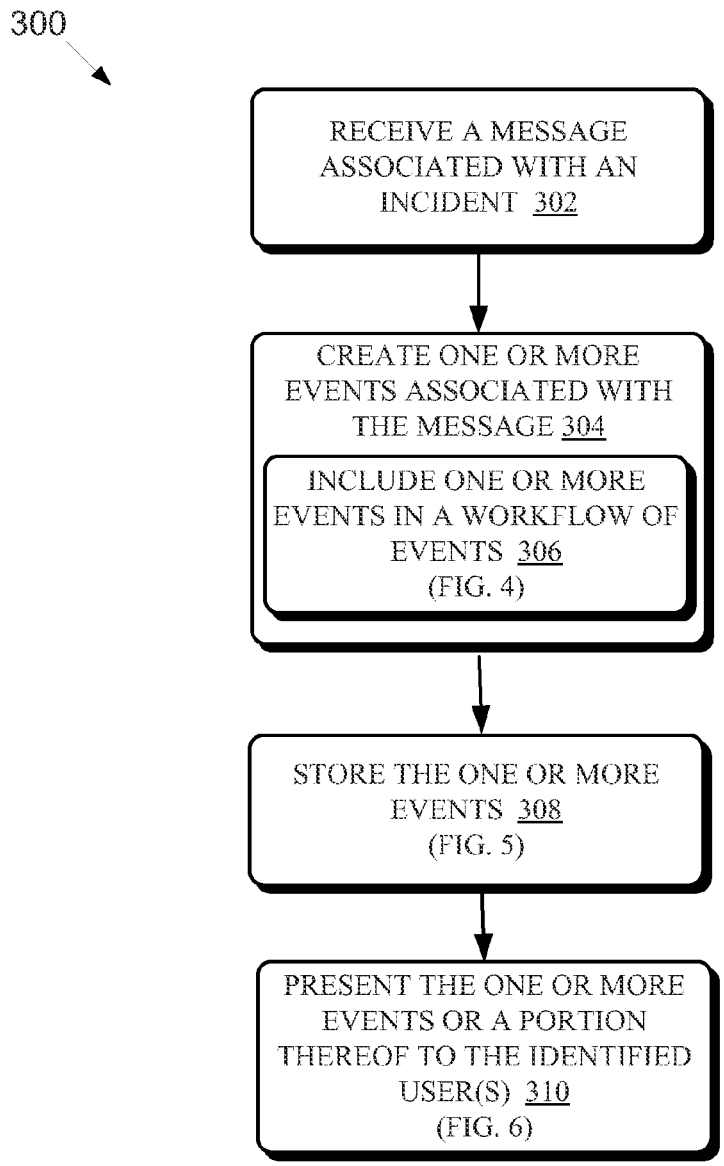
FIG. 3 illustrates an example flow diagram of a process for managing event sequences, according to one embodiment of the disclosure.

FIG. 3 illustrates an example flow diagram 300 of a process for managing event records associated with network elements, according to an illustrative embodiment. The example flow diagram 300 may be performed by an event service device 110 in FIG. 1. At block 302, a message associated with an incident may be received, e.g., by the event module 136, from the monitoring device 170, the third party device 180, or a user device 104, as non-limiting examples. As discussed above, the message can provide information to the event service device 110 related to an incident.

At block 304, one or more event records associated with the messages may be created, e.g., via the event module 136. The event records may be created to drive actions associated with an incident. For example, in response to receiving a message about an incident, an event record may be created to notify users about the incident so that the users may respond to the incident, order products that may be needed to resolve the incident, or notify hardware engineers about the order so that the engineers may plan accordingly.

Figure 4:
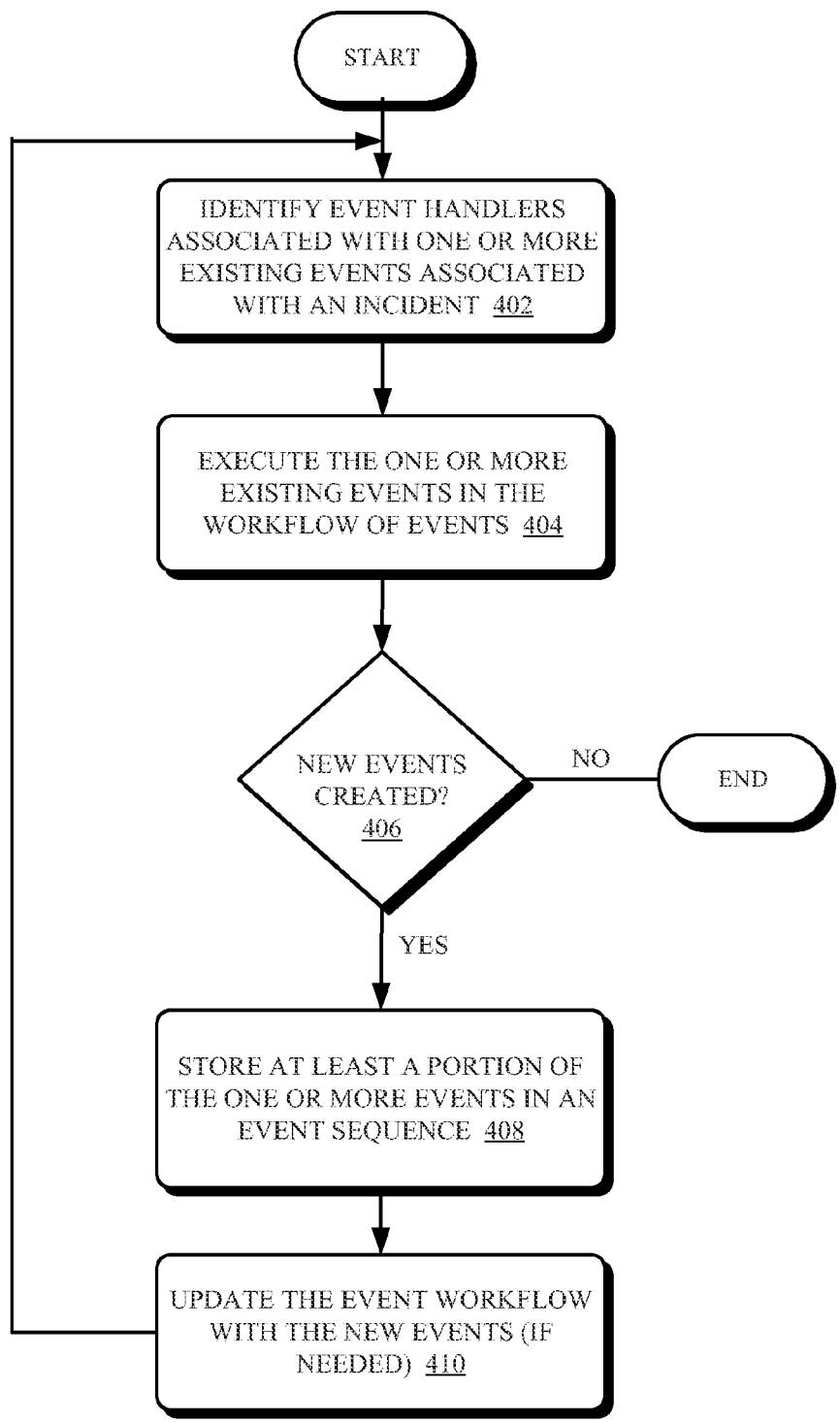
FIG. 4 illustrates an example flow diagram of managing execution of event records via a workflow, according to one embodiment of the disclosure.

The one or more created event records may be included in a workflow of event records, at block 306. The processes performed by a workflow, e.g., the workflow module 138, with respect to the workflow of event records in FIG. 3 will now be discussed in association with FIG. 4. In some embodiments, rules may be applied to a message to create an event workflow comprising one or more event records. For example, a message that provides an initial indication that an incident has occurred may invoke the application of certain rules, the application of which may result in the creation of event records to drive actions associated with an incident.

At block 402, event handlers may be identified for one or more existing event records associated with an incident. The workflow module 138 may manage event handlers to control the execution of the event records. As used herein, an event handler may be referred to as an asynchronous callback subroutine that handles or executes event records received in a program, such as the event module 136. At block 404, the one or more existing event records in a workflow associated with an incident may be executed. The execution of the one or more existing event records may create one or more new event records. If it is determined that a new event record is created at decision block 406, at least a portion of the new event record may be stored in an event sequence at block 408, which may be done by the store module 240. As discussed, event records may be stored in a particular event sequence based on whether there is a dependency between the new event records and the existing event records in that event sequence. In one embodiment, a dependency may not need to be determined between a new event record in a workflow that was created from executing another event record in the same workflow. The derivation of the new event record that may result from the execution of the existing event record may establish a dependency. Next, at block 410, a workflow may be updated with new event records that were created from the execution of existing event records, in one embodiment. Processing can return to block 402 to identify event handlers associated with the new event records, which may be executed to create one or more new event records at block 404.

Figure 5:
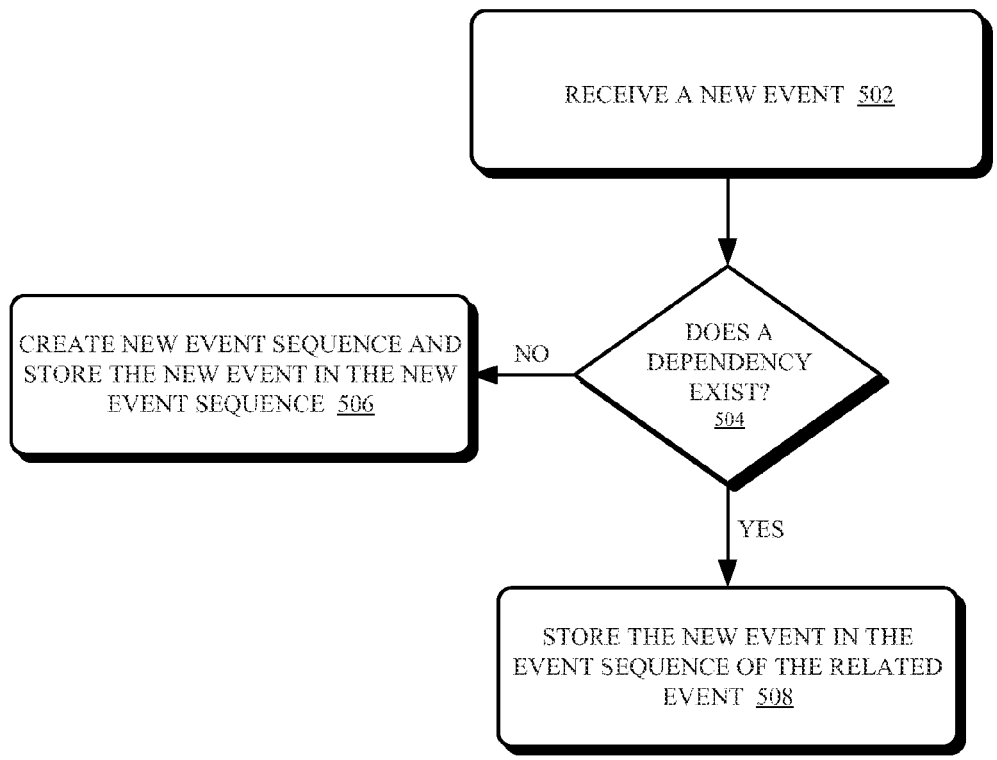
FIG. 5 illustrates an example flow diagram of a process for storing event records, according to one embodiment of the disclosure.

Returning back to FIG. 3, an event record can be stored in an event sequence at block 308, e.g., via the store module 140. A determination of which event sequence to store an event record may be determined, for example, based upon a dependency, as described in more detail and with further reference to FIG. 5 beginning at block 502.

At block 502, a new event record may be received. At decision block 504, a determination may be made as to whether a dependency exists between a new event record and pre-existing event records. As discussed above, a dependency may exist, or alternatively be sufficient, based on a number of considerations such as whether an operational relationship exists between network elements associated with the event records. If a dependency does exist, the new event record may be stored in an event sequence with the previously stored, related event records, at block 508. If a dependency does not exist, then a new event sequence may be created, and the new event record may be stored in the new event sequence, at block 506. In one embodiment, the event sequences may be time-based sequences in which event records may be ordered chronologically. Such ordering may be according to a time at which the event records were created (e.g., were executed) or a time at which they were created, as non-limiting examples.

Figure 6:
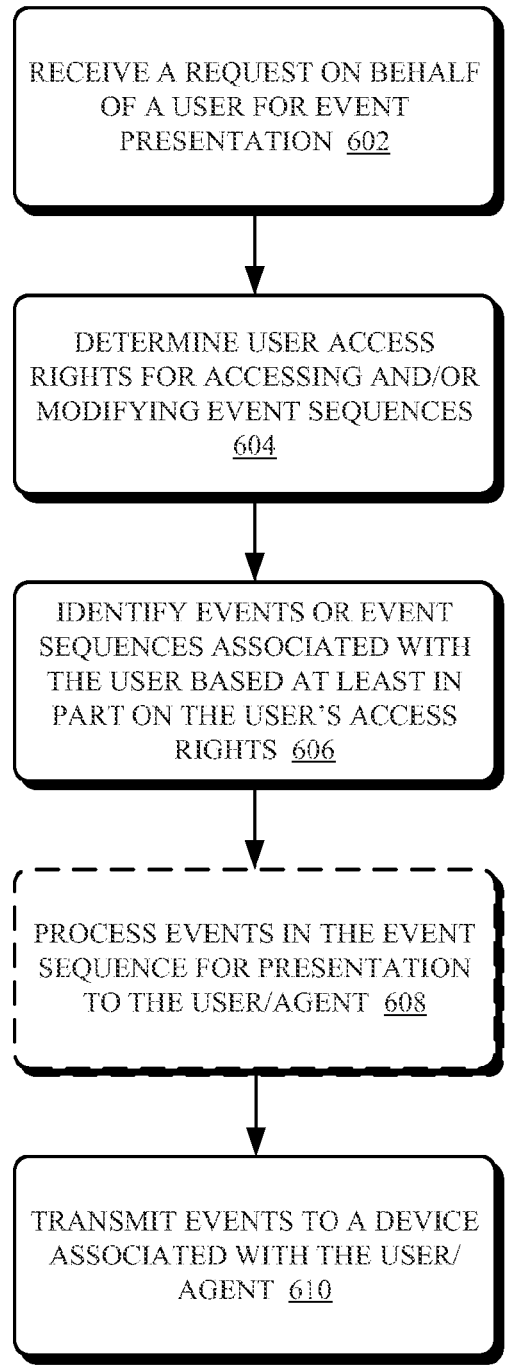
FIG. 6 illustrates an example flow diagram of a process for presenting one or more event records to a user device, according to one embodiment of the disclosure.

Returning to FIG. 3, at block 310, at least a portion of the one or more event records may be presented to a user at a user device, e.g., via the event record presentation module 144, as is discussed further in FIG. 6. FIG. 6 illustrates an example flow diagram of a process for presenting one or more event records to a user and/or third party device (referred to as an "agent"), according to one embodiment. In certain embodiments herein (e.g., the embodiment in FIG. 6), an agent may perform the same or similar functions as a user and thus, for simplification, the term "user" may include a user 102 and an agent such as a third party device 180.

At block 602, a request on behalf of a user for the presentation of event records may be received. As discussed above, the request may be in response to a user logging into an event sequence provider, such as the event service device 110, or an indication or manually initiated report from a user device associated with the user to receive updated event sequences. At block 604, access rights associated with a user account may be determined. Such rights may determine which event sequences, or portions thereof, a user may access. Access to certain event records in an event sequence may be granted while access to others may be restricted. At block 606, event records or event sequences associated with the user may be determined based at least in part on user credentials associated with the user account. Such credentials may distinguish certain users from others, e.g., a vice-president of an organization may have different access rights than an engineer reporting to the vice-president. By virtue of a user account uniquely identifying a user, event records within event sequences that may pertain to the user may be distinguished from other event records.

The event sequences associated with the user account may be processed for presentation at a user device associated with the user, at optional block 608. In one embodiment, processing the event sequences may include, but is not limited to, formatting and/or filtering the event records in preparation for display at a user device. Processing may be performed at the event service device 110 by the event presentation module 144 and/or at the user device by the message processing module 117, or both, according to different embodiments. For example, the event presentation module 144 may perform at least a portion of the event processing while the message processing module 117 may perform at least another portion. Formatting the event records may include, but is not limited to, applying color coding, visual and audible alarms, a particular ordering of the event records, and various other techniques or schemes that may enrich the presentation of event records for a particular user or device. Filtering may include, but is not limited to, selecting which portion of an event record or information related to an event record to send to the user device based at least in part on a user's access rights. The event records, or at least a portion of the event records, may be transmitted to a user device at block 610.

Figure 7:
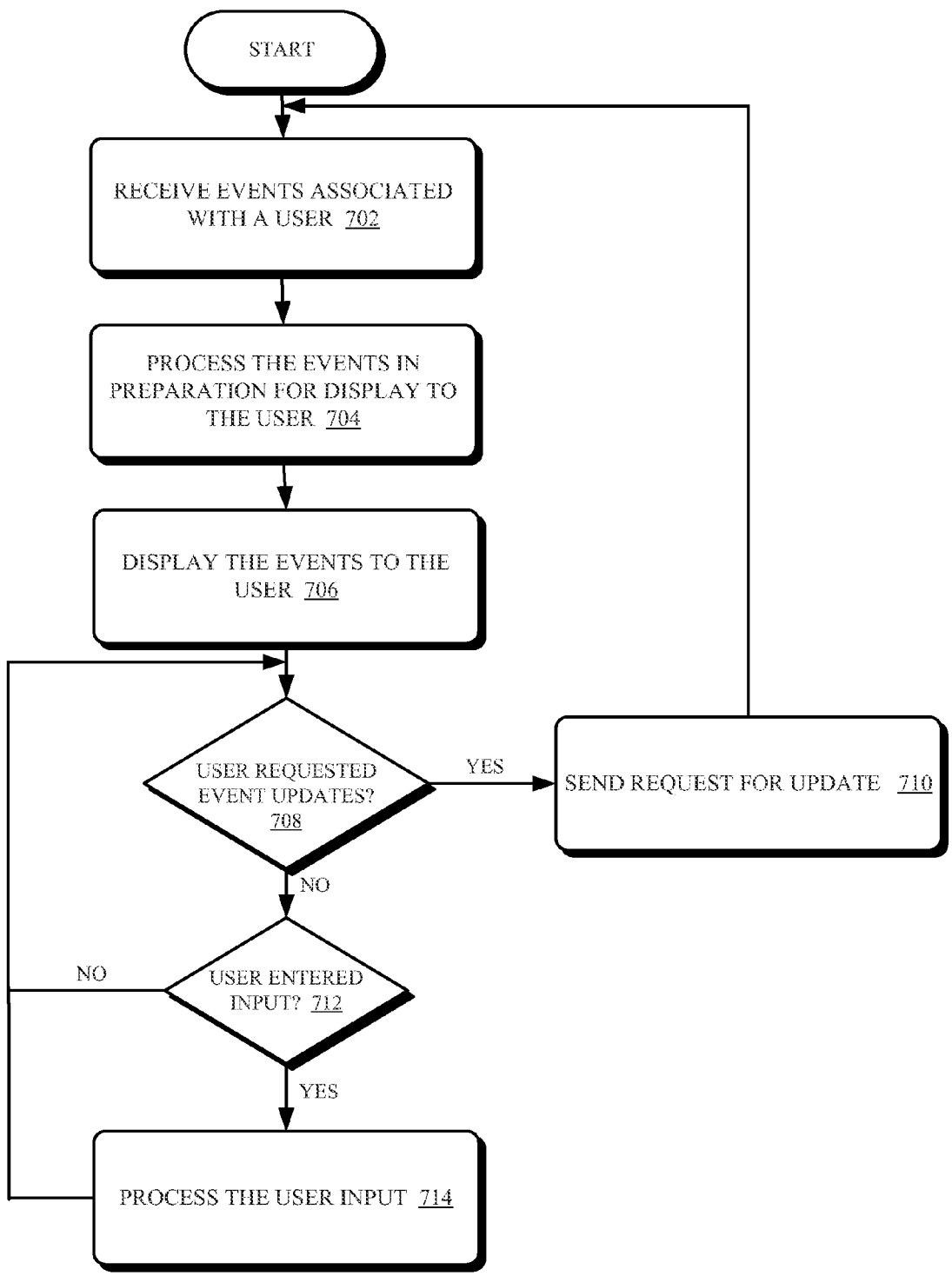
FIG. 7 illustrates an example flow diagram of processes occurring at a user device that receives event records for display, according to one embodiment of the disclosure.

FIG. 7 illustrates an example flow diagram of processes occurring at a user device that receives one or more event records for display at the user device, according to an embodiment. At block 702, event records to which the user has access rights or permission may be received at a user device. In one embodiment, the event records may be processed, which may include formatting and/or filtering the event records in preparation for display at a user device at block 704. Such processing may be performed by the message processing module 117. Processing event records may include, but is not limited to, formatting and/or filtering the event records in preparation for display at a user device. Processing may be performed at the event service device 110 by the event record presentation module 144 and/or at the user device by the message processing module 117, or both, according to different embodiments. At block 706, the event records may be displayed to a user at the user device, e.g., as a representation of event records 146 on display 116 by the browser 160 or event client application 115.

A user may request event record updates as described in association with block 602 of FIG. 6. If such a request has been made (at decision block 708), the request for the update can be sent to the event manager 134 at block 710, and processing can return to block 702. If a user has not requested event record updates, then it may be determined whether user input has been entered, at block 712. In one embodiment, the display 116 depicting the presentation of event records may also include certain event record controls 142 that may allow a user to interact with event records. For example, a user may mark or flag event records, delete event records, or add comments to event records, as non-limiting examples.

The user input may be processed at block 714, which may include sending the input to the event service device 110 for event record creation and storage in an event sequence, as described above. For example, user input to delete the event record from any future updates sent to the user. In addition, the message processing module 117 of the event client application 115 may send an indication to the event service device 110 to delete the event record for the user who entered the delete input. The event manager 134 may respond by marking the event record as deleted so that it may not be resent to the user device when subsequent requests for event record updates are received. After the user input is processed at block 714, processing may resume at decision block 708, where a determination is made whether a user has requested event record updates.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable code or program instructions. Likewise, some blocks of the block diagrams and flow diagrams may not necessarily need to be performed in the order presented, or may not necessarily need to be performed at all, according to some implementations.

These computer-executable code or program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system comprising:
   at least one memory that stores computer-executable instructions;
   at least one processor configured to access the at least one memory, wherein the at least one processor is configured to execute the computer-executable instructions to:
   receive a first message associated with a first incident;
   create at least one first event record based at least in part on the first message;
   store at least a portion of the at least one first event record in a first time-based sequence, wherein the first time-based sequence is associated with the first incident, the first time-based sequence for storing, in chronological order, one or more event records related to the at least one first event record;
   receive a second message associated with a second incident;
   create at least one second event record based at least in part on the second message;
   determine a score associated with a relationship between a first network element at which the first incident occurred and a second network element on which the first network element depends for operation, wherein the second incident occurred at the second network element;
   determine a dependency between the at least one first event record and the at least one second event record, the determination of the dependency based at least in part on a comparison between the determined score and a threshold value;
   determine whether the dependency is sufficient or insufficient based at least in part on the comparison;
   when the dependency is sufficient, store the at least one second event record in the first time-based sequence;
   when the dependency is insufficient:
   create a second time-based sequence associated with the second incident, the second time-based sequence for storing a plurality of second event records related to the at least one second event record; and
   store the at least one second event record in the second time-based sequence; and
   cause at least a portion of the at least one first event record or the at least one second event record to be sent to a user device.

2. The system of claim 1, the at least one processor further configured to execute computer-executable instructions to create one or more additional event records based at least in part on the at least one first event record.

3. The system of claim 1, wherein the first and second network elements comprise software or hardware.

4. The system of claim 1, wherein the dependency is based at least in part on a frequency of communication, a tracking identifier, a supply chain, a distribution chain, a fulfillment chain, maintenance activity, network topology, an owner, a function, or a fingerprint associating the first network element with the second network element.

5. The system of claim 1, the at least one processor further configured to execute computer-executable instructions to:
   process one of the at least one first event record, wherein the processing creates at least one third event record; and
   store the at least one third event record in the first time-based sequence.

6. The system of claim 5, the at least one processor further configured to execute computer-executable instructions to send at least a portion of the at least one third event record to the user device.

7. The system of claim 1, the at least one processor further configured to execute computer-executable instructions to:
   create a workflow comprising the at least one first event record;
   execute at least one of the at least one first event record, wherein the execution creates one or more additional event records; and
   store at least a portion of the one or more additional event records in the first time-based sequence.

8. The system of claim 1, wherein the first message comprises at least one of an indication of an occurrence of an incident, a user response to an incident, an automatic response to an incident by a computing device, an update comprising a status of an incident, or a request for information associated with an incident.

9. The system of claim 1, the at least one processor further configured to execute computer-executable instructions to process the first time-based sequence to identify one or more event records in the first time-based sequence associated with a network element.

10. The system of claim 9, the at least one processor further configured to execute computer-executable instructions to:
    create at least one third event record associated with the one or more event records; and
    send at least a portion of the at least one third event record to the user device.

11. One or more non-transitory computer-readable media storing computer-executable instructions that, when executed by at least one processor, configure the at least one processor to perform operations comprising:
    storing at least one first event record in a first time-based sequence, the first time-based sequence associated with a first incident occurring at a first network element, the first time-based sequence for storing, in chronological order, one or more event records related to the at least one first event record;

determining a dependency between at least one second event record and the at least one first event record, the at least one second event record based at least in part on a second incident occurring at a second network element, wherein determining the dependency comprises computer-executable instructions that further configure the at least one processor to perform the operations comprising (i) determining a score for a relationship between the first network element and the second network element and (ii) comparing the score to a threshold value;

when the dependency is sufficient, storing the at least one second event record in the first time-based sequence;

when the dependency is insufficient, storing the at least one second event record in a second time-based sequence;

in response to receiving a request associated with a user account, determining one or more event sequences associated with the user account; and causing at least a portion of the one or more event sequences to be transmitted to a user device associated with the user account.

12. The one or more non-transitory computer-readable media of claim 11, wherein the request is associated with a user logging into an event sequence provider or an indication from a user device to receive updated event sequences.

13. The one or more non-transitory computer-readable media of claim 11, wherein the determining is based at least in part on user credentials associated with the user account.

14. The one or more non-transitory computer-readable media of claim 11, the at least one processor further configured to perform the operation of processing the one or more event sequences for presentation at the user device.

15. The one or more non-transitory computer-readable media of claim 14, wherein the processing comprises formatting the at least a portion of the one or more event sequences for display at the user device.

16. The one or more non-transitory computer-readable media of claim 14, wherein the processing comprises filtering the one or more event sequences to identify the portion of the one or more event sequences.

17. The one or more non-transitory computer-readable media of claim 16, wherein the filtering is based at least in part on information associated with the user account, an event type associated with one or more event records in the one or more event sequences, a number of the one or more event records in the one or more event sequences, a severity level associated with the one or more event records in the one or more event sequences, or a time of occurrence associated with the one or more event records in the one or more event sequences.

18. The one or more non-transitory computer-readable media of claim 11, wherein a network incident comprises an outage, failed execution of computer code, a hardware component failure, an abnormal condition, a service request, or a request for a response by a user.

19. One or more non-transitory computer-readable media storing computer-executable instructions that, when executed by at least one processor, configure the at least one processor to perform operations comprising:

sending, from a user device, a request for one or more event sequences associated with a user account, wherein the one or more event sequences are associated with respective network incidents;

receiving at least a portion of the one or more event sequences at the user device based at least in part on the user account;

receiving, at the user device, an identification of a first network element associated with the user account, wherein a first network incident of the respective network incidents occurred at the first network element; and processing the at least a portion of the one or more event sequences for presentation at the user device, wherein the processing comprises:

determining at least one first event record of the portion of the one or more event sequences associated with the first network element, wherein the determining comprises determining a dependency between the at least one first event record and at least one second event record associated with a second network element at which a second network incident of the respective network incidents occurred, the first network element depending on the second network element for operation, wherein determining the dependency further comprises (i) determining a score for a relationship between the first network element and the second network element and (ii) comparing the score to a threshold value;

when the dependency is sufficient, causing the at least one first event record and the at least one second event record to be presented at the user device; and when the dependency is insufficient, causing the at least one first event record to be presented at the user device.

20. The one or more non-transitory computer-readable media of claim 19, the at least one processor further configured to perform the operations comprising:

receiving, at the user device, input from a user, wherein the input modifies the presentation of the at least one first event record; and sending information associated with the input to a server device, wherein the server device modifies the at least one first event record in one or more respective event sequences with respect to the user account, the modification based at least in part on the input.

21. The one or more non-transitory computer-readable media of claim 20, wherein the input causes deletion of at least a portion of the at least one first event record, a comment to be created in association with the at least one first event record, or prioritization of the at least one first event record.

22. A method comprising:

under control of one or more computer systems configured with executable instructions, receiving a first message associated with an incident;

creating at least one first event record based at least in part on the first message;

storing at least a portion of the at least one first event record in a first event sequence, wherein the first event sequence is associated with the incident, wherein the first event sequence comprises, in chronological order, one or more event records having a first dependency with the at least one event record, wherein the first dependency is based at least in part on a comparison between (i) a score associated with a relationship between a first network element at which the incident occurred and a second network element on which the first network element depends for operation and (ii) a threshold value;

receiving a second message associated with a second incident, wherein the second incident occurred at the second network element;

creating at least one second event record based at least in part on the second message;

determining a second dependency between the at least one first event record and the at least one second event record;

when the second dependency is sufficient, storing the at least one second event record in the first event sequence; and when the second dependency is insufficient, storing the at least one second event record in a second event sequence.

23. The method of claim 22, wherein the first event sequence is a time-based event sequence.

24. The method of claim 22, wherein the first message is associated with an automatic response to the incident, the automatic response performed by the first network element, wherein the first network element is in communication with the second network element.

* * * * *